United States Patent [19]
Tieleman et al.

[11] Patent Number: 5,460,567
[45] Date of Patent: Oct. 24, 1995

[54] POULTRY HOCK CUTTER APPARATUS

[75] Inventors: Rudolf J. Tieleman, Kansas City, Kans.; Eldon R. Hooley, Sun City West, Ariz.

[73] Assignee: Johnson Food Equipment Company, Kansas City, Kans.

[21] Appl. No.: 337,251

[22] Filed: Nov. 10, 1994

[51] Int. Cl.⁶ .................................................. A22C 21/00
[52] U.S. Cl. ........................... 452/167; 452/166; 30/353
[58] Field of Search ....................... 452/167, 166; 30/353, 357

[56] References Cited

U.S. PATENT DOCUMENTS

| | | | |
|---|---|---|---|
| 2,279,833 | 4/1942 | Madan | 30/353 |
| 2,606,364 | 8/1952 | Gustafson | 30/353 |
| 2,958,943 | 11/1960 | Koe | 30/353 |
| 3,281,890 | 7/1964 | Bonuchi et al. | 452/167 |
| 3,323,164 | 6/1967 | Bonuchi et al. | 452/167 |
| 3,364,515 | 1/1968 | Brown et al. | 452/167 |
| 3,522,622 | 8/1970 | Crane | 452/167 |
| 3,548,448 | 12/1970 | Vertegaal | 452/167 |
| 3,755,854 | 9/1973 | Van Mill | 452/167 |
| 4,570,295 | 2/1986 | Van Mill | 452/182 |
| 4,574,428 | 3/1986 | Meyn | 452/182 |
| 4,660,256 | 4/1987 | Innes et al. | 452/167 |

*Primary Examiner*—Willis Little
*Attorney, Agent, or Firm*—Hovey, Williams, Timmons & Collins

[57] ABSTRACT

A poultry hock cutter apparatus for separating the shanks from the drumsticks of a poultry carcass at the hocks includes a stationary blade 44 for applying a progressive wedging action into the centers of the hocks from above and behind the hocks of each carcass as the carcass is moved past the blade to force the heads out of the sockets and expose the connective tissue, and for severing the connective tissue. A method of separating the shanks from the drumsticks of a poultry carcass at the hocks includes applying a progressive wedging action by an upstream segment 48 of the stationary blade 44 at the centers of the hocks of each carcass as the carcass is moved past the blade to sever the skin coverings of the hocks and to force the heads out of the sockets, and severing the connective tissue of the hocks to separate the shanks from the legs.

14 Claims, 5 Drawing Sheets

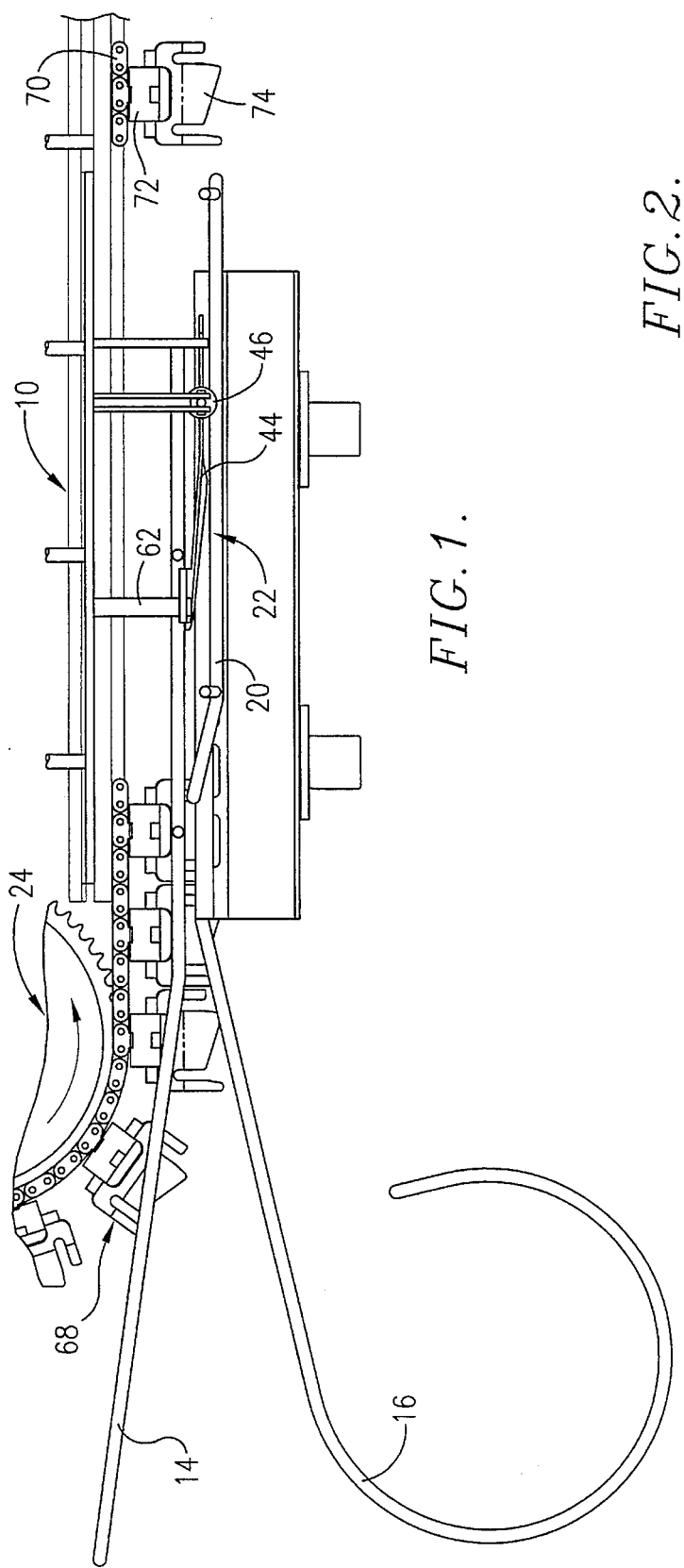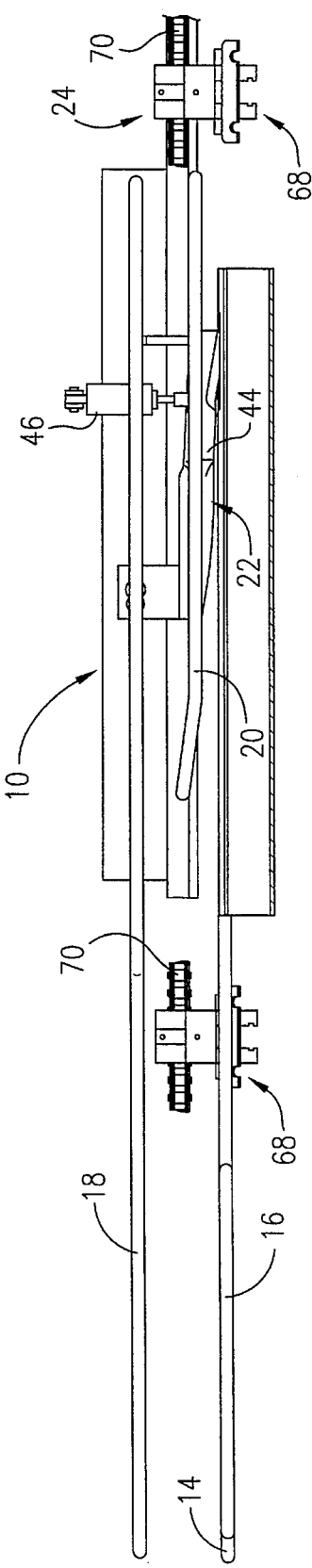

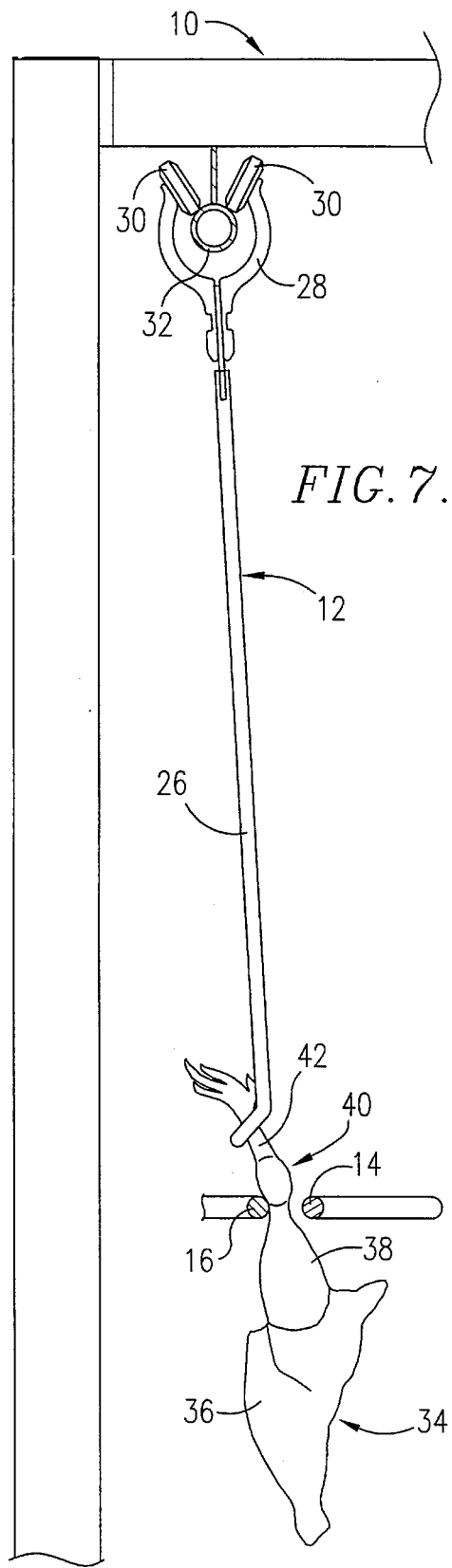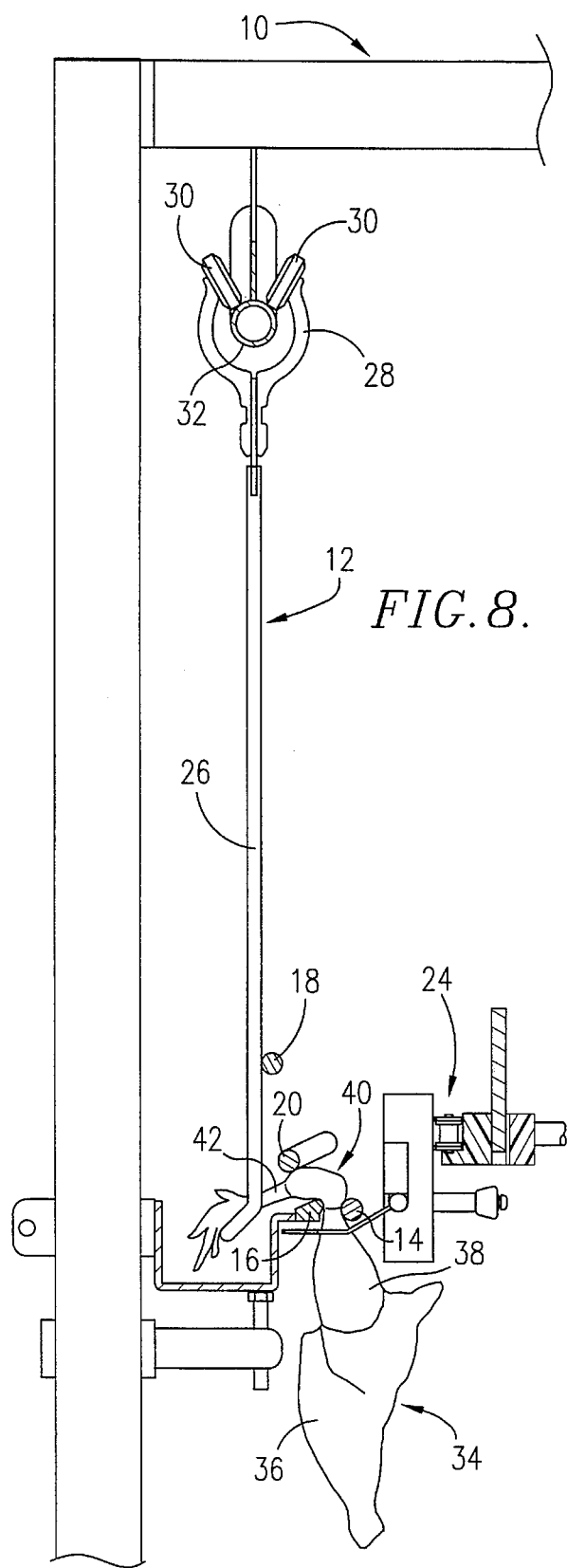

POULTRY HOCK CUTTER APPARATUS

BACKGROUND OF THE INVENTION

1. Field of the Invention

The present invention relates generally to poultry processing equipment and methods, and more particularly to a method and apparatus for severing the feet and shanks of a poultry carcass from the drumsticks at the hocks.

2. Discussion of the Prior Art

It is known to provide an apparatus for automatically removing the leg shanks from the drumsticks of poultry carcasses during processing. However, such methods have proven to be unsatisfactory because of the unreliability of severing the leg shanks from the drumsticks at precisely the right location.

Unless the hock joint is severed at the right location, chips of bone from the leg shanks may remain on the heads of the drumsticks or, conversely, the heads of the drumsticks may be partially severed. In either of these cases, the quality of the carcass becomes inferior under conventional grading systems and sales of the carcasses are significantly affected.

A conventional method of severing poultry carcass legs at the hocks is shown in U.S. Pat. No. 3,281,890, to Bonuchi et al., and includes, among other features, the use of a pair of partially overlapping wheels disposed on opposite sides of a conveyance path for applying a combination cutting and wedging action to the hocks therearound, inwardly thereof, laterally of their direction of advancement and substantially at the centers of the hocks while each carcass is advanced between the wheels in a suspended, generally vertical upside-down orientation. A drive means is provided on the device for rotating the wheels about vertical axes, and each wheel includes arcuate recesses so that, upon rotation of the wheels, the recesses of each wheel are successively closed by the other wheel.

The device illustrated in the noted Bonuchi et al. patent also includes a knife blade that is supported adjacent to the wheels and extends horizontally across the conveyance path. The knife severs the connective tissue spanning the hocks after the wheels have both severed the skin coverings of the hocks and forced the heads of the drumsticks out of the sockets in the shanks.

Although the method and device shown in the mentioned Bonuchi et al. patent provide many benefits over other conventional automated hock cutting systems, it would be desirable to further improve the reliability and ease of maintenance of a hock cutting method and apparatus relative to such conventional systems.

For example, the use of a hock cutter apparatus that must be driven for rotation or any other motion in order to carry out separation and/or severing of the drumsticks from the shanks of a carcass represents a greater potential for breakdown than a device requiring no such moving parts. Specifically, the positioning of rotating wheels or moving blades in a hock cutting system within a poultry processing line exposes any associated support bearings and driving mechanisms to an extremely adverse environment, wherein feathers and other abrasive matter are able to collect in the bearings and ruin them. As a result, such mechanisms require periodic maintenance and are less reliable than desired.

The knife employed in the conventional system is also exposed to the same environment as the rest of hock cutting components, and requires occasional maintenance to remain sharp enough to reliably sever the connective tissue of the hocks. If the blade is allowed to become too dull, there is a tendency for carcasses moving past the knife to slide along the blade and be deflected laterally without the connective tissue being severed.

OBJECTS AND SUMMARY OF THE INVENTION

It is an object of the present invention to provide a hock cutter method and apparatus utilizing a stationary blade for both separating the drumsticks and shanks from one another at the hocks to expose the connective tissue spanning the hocks, and for severing the connective tissue. Such a construction eliminates the need for support bearings and driving mechanisms that would require a high degree of maintenance, and improves the reliability of the automated hock cutting operation.

Another object of the invention is to provide an apparatus and method that bends the shanks of each carcass forward relative to the drumsticks as the carcass passes through a hock cutter assembly so that the heads on the drumsticks are exposed on the rear sides of the hocks and may be easily separated from the sockets on the shanks.

It is another object of the invention to provide a method and apparatus having a blade that cooperates with an opposed anvil to reliably sever the connective tissue of the hocks of a passing carcass so that the carcass cannot be moved past the blade with the shanks still intact with the drumsticks.

In accordance with these and other objects evident from the following description of the preferred embodiment, a poultry hock cutter apparatus is provided with a frame, a hock cutter assembly, and a plurality of shackles supported on the frame for suspending the carcasses by the feet and advancing the carcasses along a conveyance path passing through the hock cutter assembly. The hock cutter assembly includes a stationary wedging means for applying a progressive wedging action into the centers of the hocks from above and behind the hocks of each carcass as the carcass is moved past the wedging means to force the heads out of the sockets and expose the connective tissue, and a severing means for severing the connective tissue.

A method of separating the shanks from the drumsticks of a poultry carcass at the hocks includes the steps of suspending the carcasses on shackles by the feet and advancing the carcasses along a conveyance path past a stationary blade, applying a progressive wedging action with the blade at the centers of the hocks of each carcass as the carcass is moved past the blade to sever the skin coverings of the hocks and to force the heads out of the sockets, and severing the connective tissue.

BRIEF DESCRIPTION OF THE DRAWING FIGURES

The preferred embodiment of the present invention is described in detail below with reference to the attached drawing figures, wherein:

FIG. 1 is a fragmentary top plan view of a poultry processing line, illustrating a hock cutter apparatus constructed in accordance with the preferred embodiment;

FIG. 2 is a front elevational view of the hock cutter apparatus;

FIG. 7 is a sectional view of the apparatus, illustrating a carcass suspended from a shackle at a position upstream of the hock cutter blade;

FIG. 8 is a sectional view of the apparatus, illustrating the carcass as it enters the hock cutter apparatus;

DETAILED DESCRIPTION OF THE PREFERRED EMBODIMENT

Figure 4:
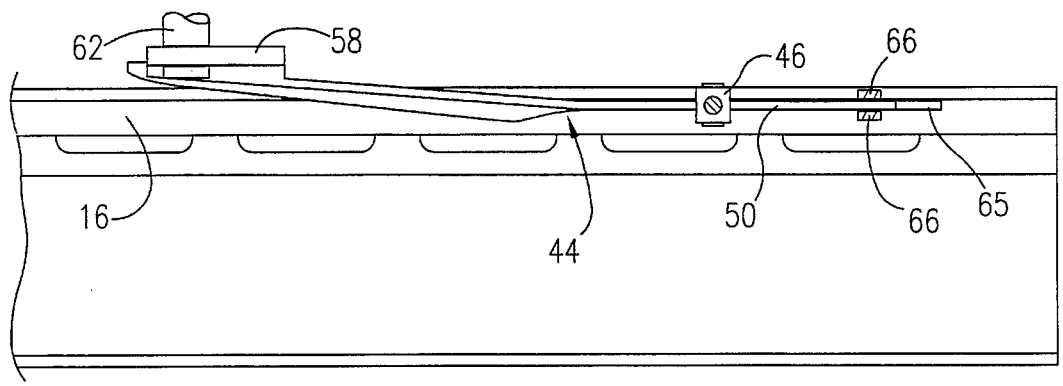
FIG. 4 is a sectional view of the apparatus illustrating the blade from above.

A hock cutter apparatus is shown in FIG. 1, and is provided in a poultry processing line at a position between a defeathering station and an eviscerating station. The hock cutter apparatus broadly includes a frame 10, an upper conveyor assembly 12, illustrated in FIG. 7, for conveying carcasses through the apparatus along the processing line, a plurality of guides 14, 16, 18, 20, shown in FIG. 2, for guiding the carcass through the apparatus, a hock cutter assembly 22, and a lower conveyor assembly 24 for conveying carcasses from the apparatus upon completion of the hock cutting operation.

As a convention in the present application, reference is made to a conveyance path, which is the path travelled by each carcass through the apparatus. The placement of components longitudinally of the apparatus relative to this path are described as being upstream or downstream of other components relative to the direction of travel of carcasses through the apparatus.

Likewise, in order to describe the position of a component laterally relative to the conveyance path, reference is made to whether the direction of offset is "forward" of the path, i.e. toward the front side of the carcass, or "rearward" of the path. Thus, reference will be made to the placement of components of the preferred embodiment relative to the orientation of a poultry carcass being moved through the apparatus.

Applying this convention to the drawing, it is noted that the upstream end of the conveyance path is located on the left side of FIGS. 1–4, and that the downstream end is located on the right side of these figures. Likewise, the forward side of the apparatus is located on the left side of FIGS. 5–14, and the rearward side of the apparatus is located on the right side of these figures.

The frame 10 of the preferred apparatus is a simple upstanding structure that rests on the floor of a poultry processing plant, and includes a plurality of legs connected together by longitudinally and laterally extending frame elements. The conveyor assemblies, guides and hock cutter assembly are all supported on the frame.

The upper conveyor assembly 12 is illustrated in FIG. 7, and is of a conventional construction. The assembly is formed of individual shackles 26, each suspended from a carriage 28 that is generally C-shaped. Each carriage includes rollers 30 on the upper free ends thereof adapted to engage either side of a support rail 32 that is secured to the frame. The support rail 32 preferably is formed of a pipe that extends along and above a conveyance path through the apparatus. The carriages 28 are connected together by links so that the entire assembly 12 may be moved relative to the frame by a conventional drive means that engages the links and moves them along the rail 32.

The lower end of each shackle 26 is configured to provide a means for suspending a poultry carcass 34 from the feet thereof, with the feet extending through the shackle such that the bottoms of the feet face upward and the breast 36 of the carcass faces forward of the apparatus. Preferably, the shackle configuration includes a pair of laterally spaced notches sized for receipt of the carcass feet, wherein each notch includes a lower angled end that is bent forward of the apparatus so that the carcass can hang substantially straight down from the shackle.

Figure 5:
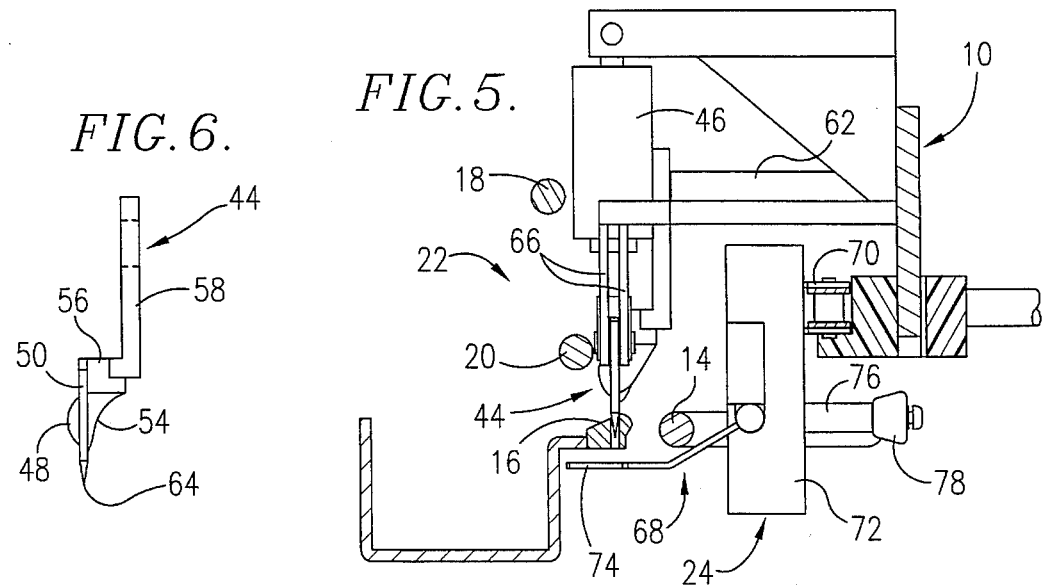
FIG. 5 is a sectional view taken along line 5—5 of FIG. 3.

Turning to FIG. 5, the inside and outside guide rails 14, 16 are secured to the frame at a height adapted to engage the drumsticks 38 of passing carcasses at a point immediately beneath the hocks 40 of the suspended carcass. As shown in FIG. 1, the guide rails diverge from one another and open up toward the upstream end of the apparatus so that carcasses being conveyed into the apparatus are guided between the rails. The guide rails 14, 16 run parallel to one another along the remainder of the length of the apparatus, and define the conveyance path along which each carcass is conveyed.

The guide rail 18 is a shackle camming rail, as shown in FIG. 8, and extends above and forward of the conveyance path. The camming rail extends along the length of the hock cutter assembly, and serves to cam each shackle laterally forward of the conveyance path as the shackle conveys a carcass through the hock cutter assembly. Preferably, the guide rail 18 is spring-biased laterally forward of the conveyance path so that the rail exerts a predetermined camming force on the shackles. The support rail 32 on the frame has a depending section along the length of the hock cutter assembly that is lower than the remainder of the rail so that as the shackles 26 are driven along the rail they are lowered vertically to the position shown.

By camming each shackle forward of the conveyance path and lowering it as it passes the hock cutter assembly, the shanks 42 of the carcass supported in the shackle are allowed to be bent forward and downward over the outside guide rail 16 relative to the drumsticks 38. Thus, the heads or knuckles on the drumsticks are pivoted partially out of the sockets on the shanks, and are easily accessible from above as the carcass passes through the hock cutter assembly.

In order to ensure that the hocks are bent forward around the outside guide rail, the guide rail 20 is provided. This rail defines a shank guide, and is secured to the frame and extends along the conveyance path just above and forward of the outside guide rail relative to the frame. The shank guide rail 20 engages the upper sides of the shanks of each carcass and forces the shanks downward against the outside guide rail 16.

Figure 3:
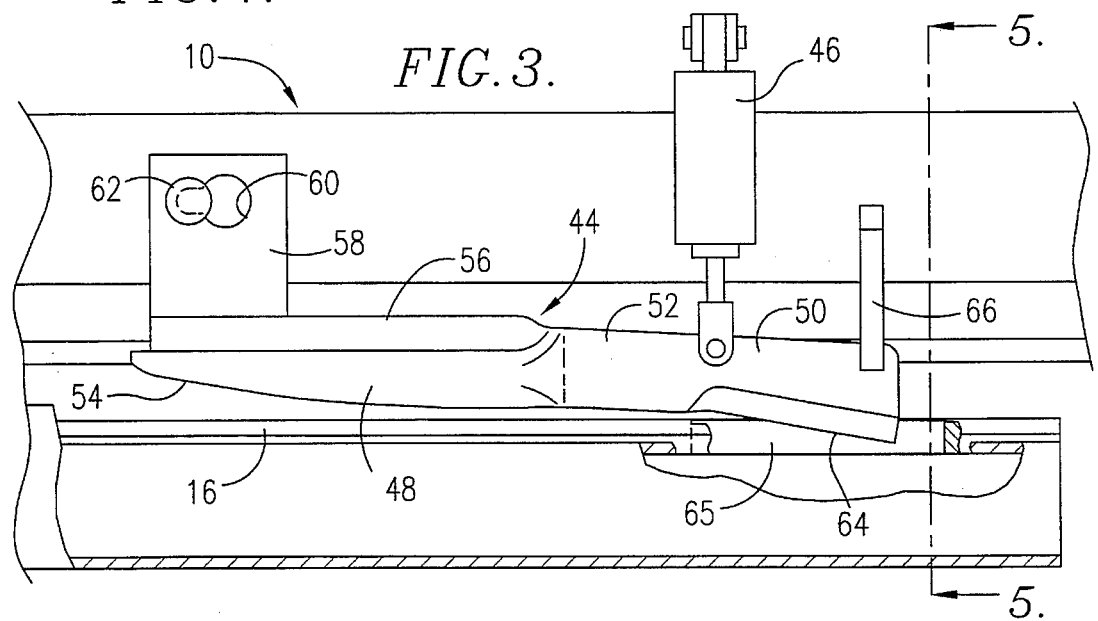
FIG. 3 is a front elevational view of the apparatus, illustrating a blade forming a part thereof.

The hock cutter assembly is illustrated in FIG. 3, and broadly includes a blade 44, a means for mounting the blade on the frame, a clearing mechanism 46 for allowing movement of the blade when necessary to prevent damage to the device, and an anvil formed in the guide rail 16 that cooperates with the blade to carry out severing of the shanks of each carcass from the drumsticks at the hocks.

The blade 44 includes two longitudinal segments, an upstream segment 48 shaped for separating the drumsticks from the shanks at the hocks to expose the connective tissue spanning the hocks, and a downstream segment 50 shaped for severing the connective tissue to separate the drumsticks from the shanks. Preferably, these segments 48, 50 are provided on a single blade, and are separated from one another in the longitudinal direction of the blade by an intermediate region 52 that holds the drumsticks away from the shanks to prevent the hocks from closing back together and covering the connective tissue.

The upstream segment 48 of the blade defines a means for applying a progressive inward and downward wedging action at the centers of the hocks of each carcass as the carcass is moved past the blade to sever the skin coverings of the hocks and to force the heads on the drumsticks from the sockets on the shanks.

Preferably, the upstream segment is formed in the shape of a hollow half cylindrical shell defining a longitudinal axis and having a lower portion of the shell cut away along a helical line to define a helical lower edge 54 of the segment. At the free end of the upstream segment the helical lower edge 54 is disposed above the longitudinal axis adjacent the upper edge defined by the half cylindrical shell. Preferably the lower edge is spaced from the upper edge by about one quarter inch around the circumference of the shell at the free end thereof.

Figure 9:
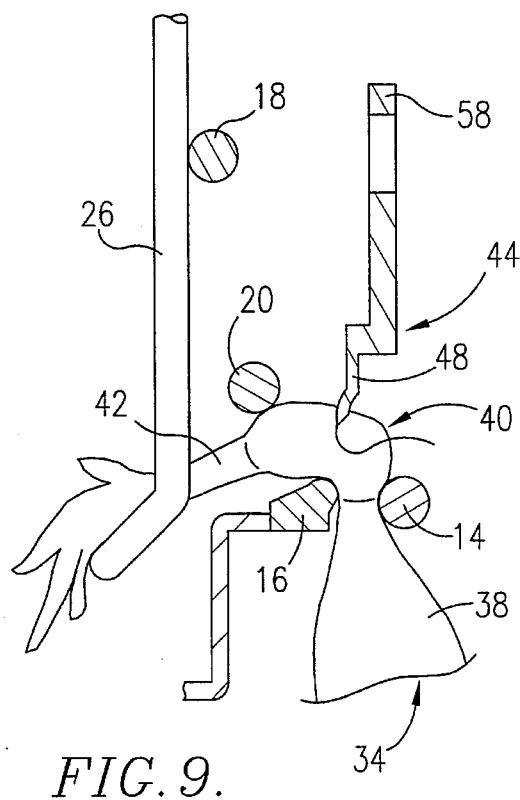
FIG. 9 is a fragmentary sectional view of the apparatus, illustrating the carcass during movement past an upstream end of the blade.
Figure 10:
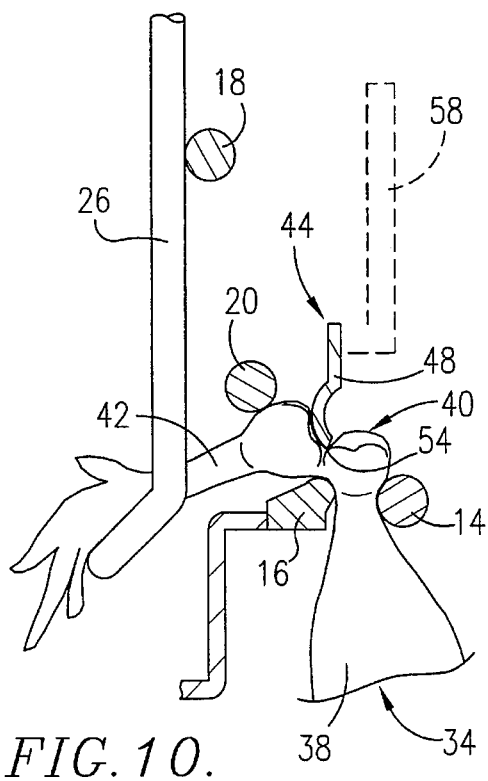
FIG. 10 is a fragmentary sectional view of the apparatus, illustrating the carcass during continued movement past the blade beyond the position of FIG. 9.
Figure 11:
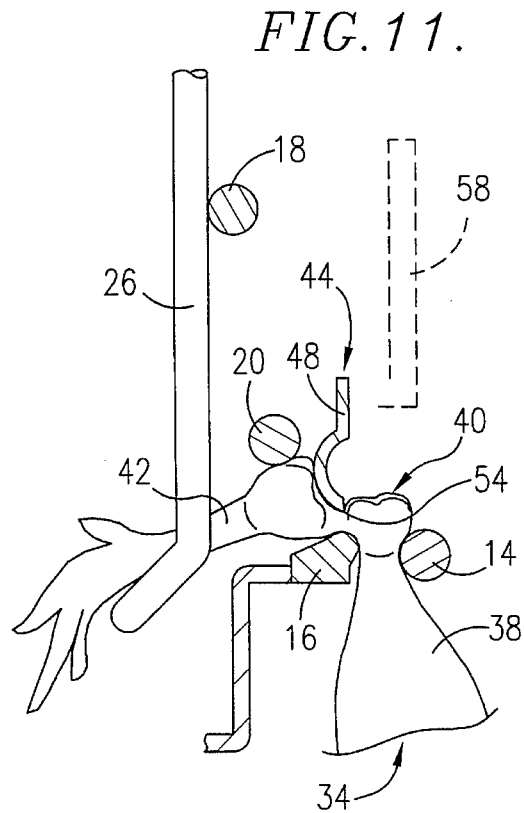
FIG. 11 is a fragmentary sectional view of the apparatus, illustrating the carcass during continued movement past the blade beyond the position of FIG. 10.

Along the length of the upstream segment, as shown in FIGS. 9-11, the helical edge 54 extends around the longitudinal axis and forward of the axis relative to the frame. At the downstream end of the segment 48, the lower helical edge 54 is disposed substantially vertically beneath the upper edge of the half cylindrical shell. Thus, the helical lower edge extends along the entire length of the half cylindrical shell and extends circumferentially of the longitudinal axis over an angle of about 180°.

By providing this shape in the upstream segment of the blade, the lower helical edge 54 functions to catch the heads on the drumsticks of each carcass as the carcass is moved past the blade, and to pull the drumsticks rearward away from the sockets on the shanks. By this action, the drumsticks are torn slightly from the shanks at the hocks to prevent the drumsticks and shanks from pulling back together before passing on to the rear segment of the blade.

In addition, because the upstream end of the helical lower edge is the highest point on the edge, the upstream segment of the blade is able to accommodate carcasses of varying sizes without requiring adjustment in the position of the blade. Thus, it is not necessary to move the blade at all during a hock cutting operation.

As shown in FIG. 3, an elongated, rectangular flat plate 56 is provided along the upper edge of the half cylindrical shell, and defines a surface to which a lug 58 may be welded or otherwise attached to the forward segment. The rectangular flat plate 56 preferably has a height of about one-half to one inch and a length substantially equal to the length of the upstream segment so that the plate extends along the length of and upward from a half cylindrical shell.

The lug 58 is welded to the rearward surface of the plate 56, and includes a keyhole-shaped hole 60 by which the blade is supported on the frame. The hole 60 includes a large diameter section sized for receipt over the head of a pin 62 provided on the frame, and a small diameter section extending to a side of the large diameter section. The pin 62 on the frame preferably includes an annular groove within which the pin has a diameter slightly less than that of the small diameter section. When mounting the blade, the large diameter section of the hole 60 is placed over the head of the pin and the lug is aligned with the annular groove of the pin so that the blade may be shifted longitudinally to position the small diameter section of the hole around the pin within the annular groove.

Figure 6:
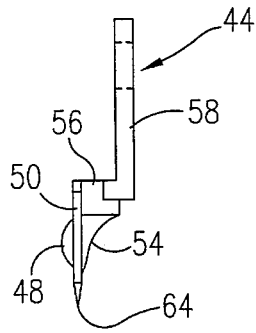
FIG. 6 is an end elevational view of the blade.

The downstream segment 50 of the blade is formed of a flat plate that is welded at the front end thereof to the rear end of the upstream segment 48. The plate is disposed within a vertical plane that is parallel to a plane within which the lug 58 is disposed, as shown in FIG. 4, such that when the blade is mounted on the frame, the lug and rear segment of the blade are aligned with the conveyance path through the apparatus and the upstream segment 48 is angled, with the rear end of the upstream segment disposed laterally forward of the front end thereof relative to the path. This orientation of the blade segments and lug is illustrated in FIG. 6.

Returning to FIG. 3, the downstream segment 50 includes a generally horizontal upper edge and a lower edge 64 that is generally horizontal along the intermediate region 52 of the blade. However, the lower edge is angled downward toward the downstream end of the blade along about one half of the length of the downstream segment 50, and this angled lower edge is sharpened to define a means for severing the connective tissue spanning the hocks of a carcass as the carcass is moved past the edge.

As shown in FIGS. 9-13, material is preferably added to the outside guide rail 16 along the length of the blade to define an anvil around which the shanks 42 of each carcass are wrapped as the carcass is moved through the hock cutter assembly. The anvil extends slightly downstream of the blade and includes a vertical slot 65, shown in FIG. 3, within which the lower edge 64 of the downstream blade segment is received when the blade is mounted on the frame.

The clearing mechanism 46 is shown in FIG. 3, and is provided for allowing the blade 44 to pivot about the pin 62 by a distance sufficient to lift the lower edge 64 of the rear blade segment out of the slot and free of the anvil when an upward force is exerted on the blade which exceeds a predetermined force greater than that necessary to sever the connective tissue spanning the hocks of the carcass. The clearing mechanism 46 includes a pneumatic cylinder assembly mounted between the frame and the downstream segment of the blade, and air of a predetermined pressure, typically between 40 and 60 psi, is supplied to the cylinder assembly to maintain a downward force on the blade to normally hold the lower edge of the downstream blade segment within the slot.

When material such as feathers or other debris builds up beneath the blade 44, or when some other foreign object becomes wedged within the conveyance path and exerts an undue upward force on the blade of a magnitude sufficient to damage the blade or other components of the apparatus, the force applied by the cylinder assembly 46 is overpowered, and the blade lifts from the slot to allow passage of the object. The amount of pressure supplied to the cylinder assembly may be adjusted during setup of the apparatus to provide optimum performance of the clearing assembly so that the cutter assembly provides reliable severing of the hocks of carcasses as they move past the blade, while protecting against damage to the apparatus.

One advantage of the preferred construction over conventional devices results from the positioning of the lower edge 64 of the downstream blade segment 50 within the slot of the anvil. By providing this construction, the hocks of a carcass are forced against the blade by the anvil as the carcass is moved through the cutter assembly, insuring that the connective tissue spanning the hocks will be severed. Without this cooperation between the anvil and the blade, it would be possible for the connective tissue of the hocks to slide along the length of the blade without being severed unless the lower edge of the downstream blade segment was extremely sharp.

A pair of vertical guides 66 are connected to the frame 10 and sandwich the downstream end of the blade 44 to guide pivoting movement of the blade during operation of the clearing mechanism 46. In addition, the vertical guides 66 maintain the lower edge of the blade within the slot during operation of the apparatus.

The lower conveyor assembly 24 is conventional, and includes a plurality of fork assemblies 68, shown in FIG. 5, supported on a drive chain 70. Movement of the drive chain is coordinated with movement of the upper conveyor assembly so that a fork assembly is aligned vertically with each shackle on the upper assembly.

Each fork assembly 68 includes a carriage 72 that is secured to the drive chain, and a fork 74 connected to the carriage by a hinge which permits the fork to pivot about a horizontal axis that is parallel with the conveyance path. A pin 76 is connected to each fork and extends in a direction opposite to the fork relative to the hinge. Each pin is provided with a roller 78 that is adapted to engage a cam surface for controlling the angular position of the fork relative to the carriage as each fork assembly travels along the length of the apparatus.

Figure 14:
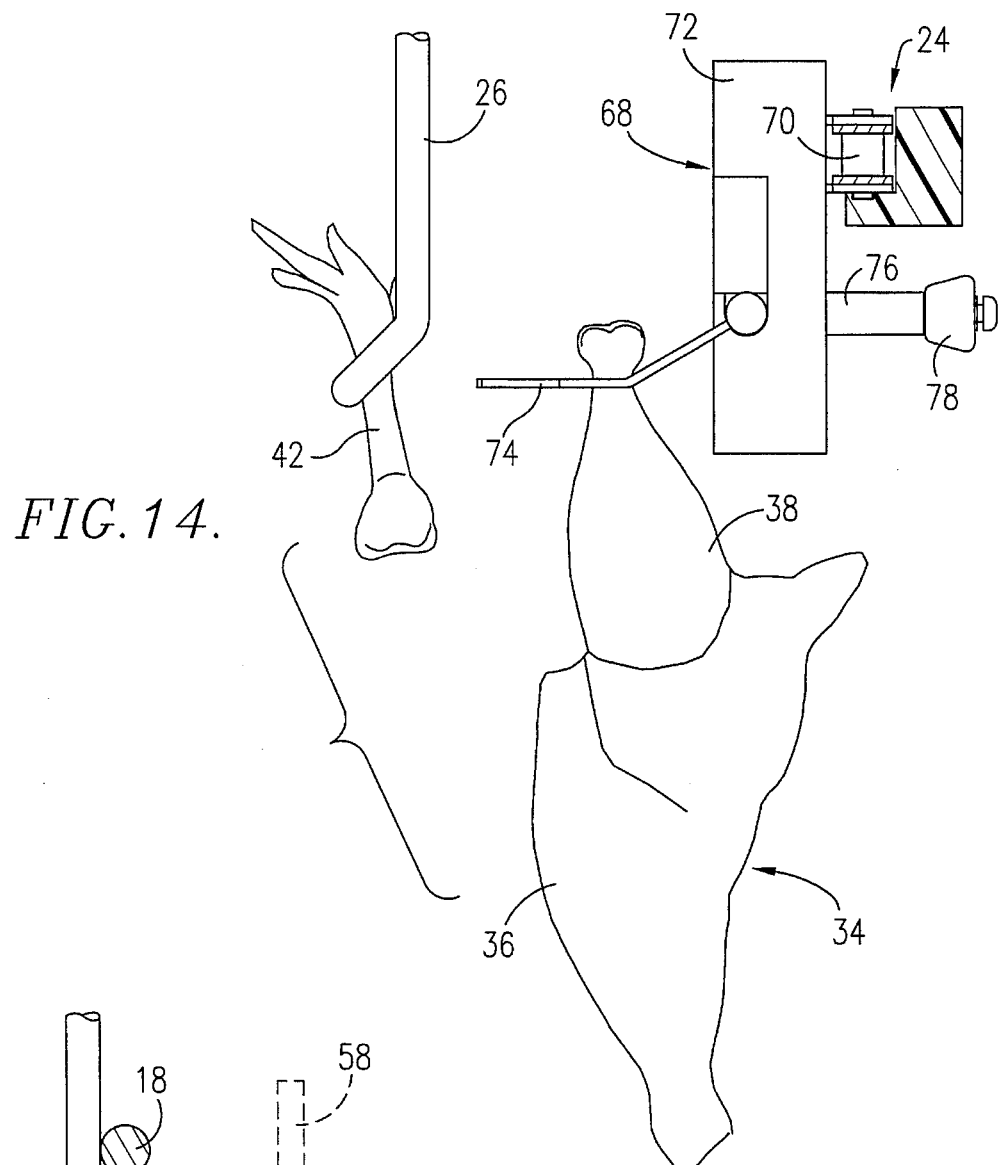
FIG. 14 is a fragmentary sectional view of the apparatus, illustrating the carcass upon delivery from the downstream end of the hock cutter apparatus.

As shown in FIG. 1, each fork 74 includes a pair of notches sized for receipt of a drumstick so that a carcass may be suspended from each fork by the heads on the drumsticks after the shanks and drumsticks of the carcass have been severed at the hocks. Thus, the lower conveyor assembly is used to catch the carcasses as the hocks are severed, and to deliver the carcasses from the apparatus for further processing, as shown in FIG. 14.

During operation, poultry carcasses are conveyed by the upper conveyor assembly into the upstream end of the hock cutter apparatus from a defeathering station. As shown in FIG. 7, each carcass is received between the inside and outside guide rails 14, 16 as the carcass enters the apparatus, and these guide rails engage the drumsticks of the carcass at a point slightly beneath the heads on the drumsticks.

As a carcass is conveyed along the conveyance path, as shown in FIG. 8, the shackle 26 supporting the carcass is cammed laterally forward of the conveyance path with a predetermined force by the rail 18, drawing the feet and shanks of the carcass over the outside guide rail 16. At the same time, the shackle is lowered on the frame to permit the feet and shanks to be further formed around the outside guide rail and anvil. By biasing the rail 18 in a direction laterally forward of the conveyance path, the rail accommodates birds of various sizes. For example, if a carcass having short shanks is carried by the shackle, it is only cammed forward by the necessary distance to draw the shanks across the anvil, while a shackle carrying a carcass with longer shanks would be cammed further forward to achieve the same orientation of the shanks.

The shank guide rail 20 engages the rear sides of the shanks 42, which are facing upward, and ensures that the shanks rest against the anvil at an angle to the drumsticks 38 which are suspended generally vertically between the rails due to gravity. Because the breast 36 of the carcass faces forward, this bending forward of the shanks and feet exposes the heads on the drumsticks at the upper rear sides of the hocks, allowing access to the hocks from above.

As shown in FIG. 9, once the shanks 42 are folded over the anvil 16 to expose the heads on the drumsticks, this orientation is maintained as the carcass continues past the blade 44. As the upstream segment 48 of the blade is engaged by the carcass, the lower helical edge 54 applies a wedging action inward of the hocks around the heads on the drumsticks.

Continued movement of the carcass past the blade, as shown in FIG. 10, draws the carcass along the lower helical edge so that the edge is able to separate the heads on the drumsticks from the sockets on the shanks. This inward and downward wedging action continues, as shown in FIG. 11, so that the drumsticks are completely separated from the shanks except for certain remaining connective tissue including tendons, ligaments and possibly other softer tissue.

Figure 12:
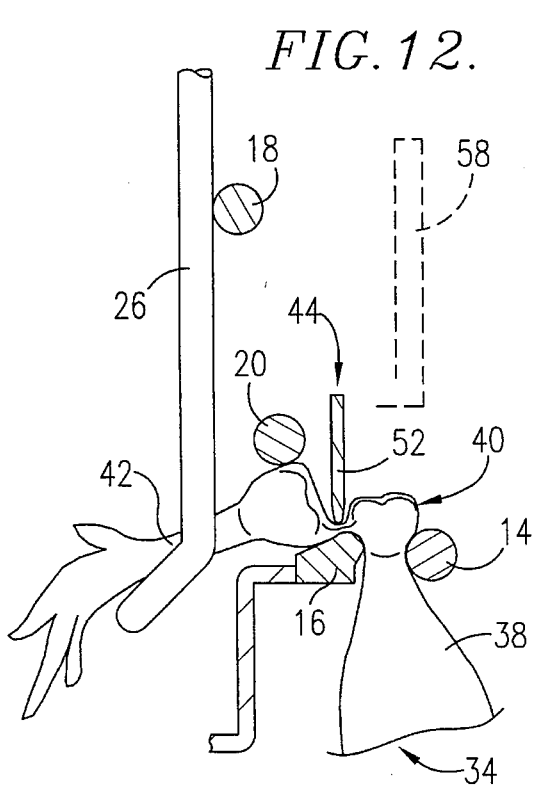
FIG. 12 is a fragmentary sectional view of the apparatus, illustrating the carcass during continued movement past the blade beyond the position of FIG. 11.

As the lower helical edge 54 is wedged into the hocks of the carcass, the half cylindrical shell of the upstream segment 48 forces the drumsticks and shanks apart, tearing the connective tissue sufficiently to prevent the drumsticks and shanks from moving back together after the carcass passes the upstream segment. Thus, separation at the hocks is maintained as the carcass moves beneath the intermediate region 52 of the blade, as shown in FIG. 12.

Figure 13:
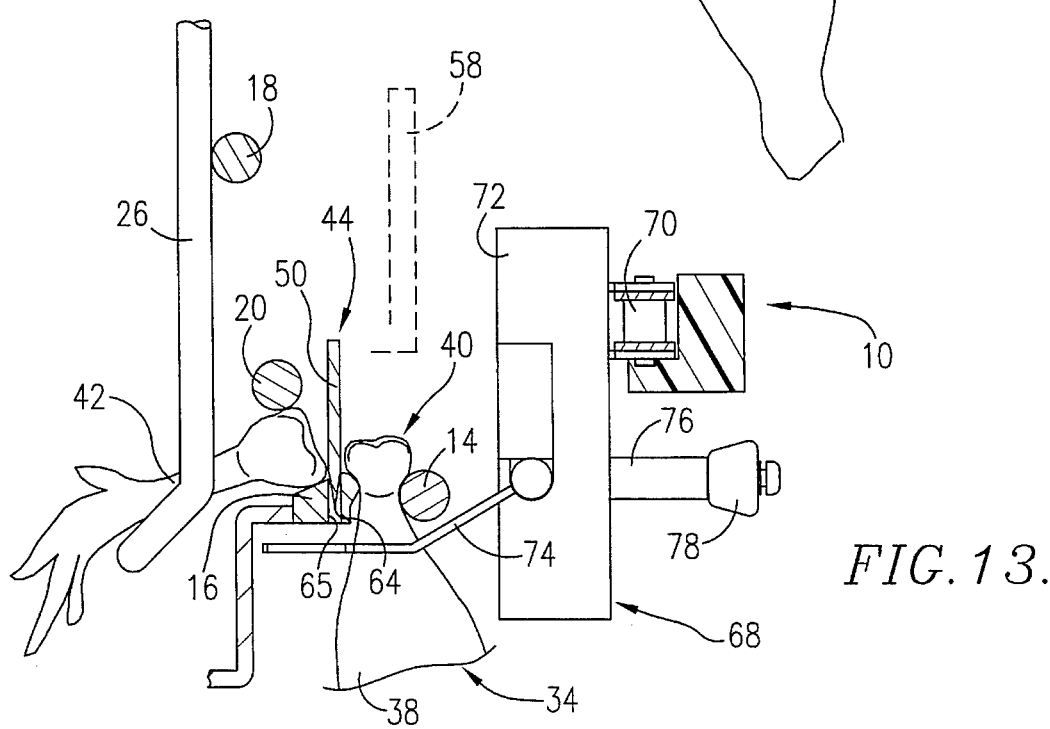
FIG. 13 is a fragmentary sectional view of the apparatus, illustrating the carcass during continued movement past the blade beyond the position of FIG. 12.

As the connective tissue spanning the hocks of the carcass is moved between the anvil 16 and the lower edge 64 of the downstream blade segment 50, as shown in FIG. 13, they are forced against the edge by the anvil, and are severed completely to remove the feet and shanks from the carcass. Thereafter, as shown in FIG. 14, the carcass is conveyed from the apparatus on a fork 74 of the lower conveyor assembly and the feet and shanks are removed from the shackles in a conventional manner.

If a foreign object is inserted into the conveyance path beneath the blade, and is of a hardness sufficient to damage the blade or other components of the apparatus, the object forces the downstream segment of the blade upward out of the slot in the anvil against the force exerted by the clearing mechanism 46. In this manner, damage to the apparatus is minimized. However, during normal operation of the apparatus, as shown in FIG. 3, the lower edge 64 of the downstream blade segment 50 is maintained within the slot of the anvil 16 by a downward force suitable to provide reliable severing of the connective tissue of carcasses being moved past the blade. This force is adjustable to achieve optimum performance of the apparatus. However, nothing is provided on the apparatus for reciprocating the blade or for moving it in any way during a normal cutting operation, and the blade is designed for stationary operation.

Although the invention has been described with reference to the preferred embodiment illustrated in the attached drawing figures, it is noted that substitutions may be made and equivalents employed herein without departing from the scope of the invention as recited in the claims. For example, although conventional materials are employed in constructing all of the components of the preferred apparatus, any other materials may be used where appropriate to obtain a desired result.

What is claimed is:

1. A poultry hock cutter apparatus for separating the shanks from the drumsticks of a poultry carcass at the hocks, wherein the carcass includes heads on the drumsticks, sockets on the shanks, and connective tissue spanning the hocks, the apparatus comprising:

a frame;

a hock cutter assembly provided on the frame;

a plurality of shackles supported on the frame for suspending the carcasses by the feet and advancing the carcasses along a conveyance path passing through the hock cutter assembly; and a positioning means for bending the shanks forward of the drumsticks relative to the carcass to expose the heads of the drumsticks upward, the hock cutter assembly including a stationary wedging means for applying a progressive wedging action into the centers of the hocks from above and behind the hocks of each carcass as the carcass is moved past the wedging means to force the heads out of the sockets and expose the connective tissue, and a severing means for severing the connective tissue.

2. An apparatus as recited in claim 1, wherein the wedging means and severing means are defined by a blade that is supported on the frame for stationary operation as carcasses are moved along the conveyance path past the blade.

3. An apparatus as recited in claim 2, further comprising a clearing means for allowing the blade to be cleared from the conveyance path relative to the frame when a force is exerted on the blade which exceeds a predetermined force greater than that necessary to sever the connective tissue of the hocks, the clearing means maintaining the position of the blade in the conveyance path as long as the force exerted on the blade is less than the predetermined force.

4. An apparatus as recited in claim 1, wherein the positioning means includes a guide means for guiding the drumsticks of each carcass along the conveyance path, and a cam means for camming each shackle laterally forward of the conveyance path with a predetermined force so that the feet and shanks of each carcass are drawn forward of the drumsticks relative to the carcass as the carcass passes through the hock cutter assembly.

5. An apparatus as recited in claim 1, further comprising a means for lowering the shackles relative to the hock cutter assembly as the shackles are moved past the assembly so that the shanks of each carcass may be bent forward of the drumsticks relative to the carcass.

6. An apparatus as recited in claim 1, wherein the wedging means includes a blade presenting an elongated hollow cylindrical segment defining a longitudinal axis and having upstream and downstream ends, the cylindrical segment presenting an upper edge extending between the upstream and downstream ends in a direction parallel to the longitudinal axis of the cylindrical segment and a helical lower edge that is adjacent the upper edge of the segment at the upstream end of the segment and spaced circumferentially from the upper edge at the downstream end of the segment.

7. An apparatus as recited in claim 1, wherein the severing means includes a blade presenting a flat segment disposed within a generally vertical plane aligned with the conveyance path, the blade including a lower cutting edge that is angled downward through the conveyance path for severing the connective tissue spanning the hocks to separate the shanks from the legs; and an anvil supported along the conveyance path beneath the blade, the anvil including a slot within which the lower cutting edge is disposed so that the connective tissue of each carcass is forced against the lower cutting edge by the anvil and is severed as the carcass is moved past the blade.

8. A cutter blade for separating a pair of bones of a poultry carcass at the joint between the bones, wherein one of the bones includes a head, and the other bone includes a socket within which the head is normally seated, the carcass including connective tissue spanning the joint, the blade comprising:

an elongated upstream segment defining a longitudinal axis and having opposed axial ends, the upstream segment presenting a helical lower edge that is adapted to apply a progressive wedging action into the center of the joint from above and behind the joint as the carcass is moved past the upstream segment to force the head out of the socket and expose the connective tissue; and a downstream segment connected to the upstream segment and disposed within a generally vertical plane aligned with the conveyance path, the flat segment presenting a lower cutting edge for severing the connective tissue to separate the bones from one another.

9. A blade as recited in claim 8, wherein the upstream segment is formed in the shape of a hollow half cylindrical shell defining a longitudinal axis and having a lower portion of the shell cut away along a helical line defining the helical lower edge.

10. A blade as recited in claim 8, further comprising a lug connected to the upstream segment of the blade, the lug including a hole for permitting mounting of the blade on a cutter apparatus.

11. A method of separating the shanks from the drumsticks of a poultry carcass at the hocks, wherein the carcass includes heads on the drumsticks, sockets on the shanks, and connective tissue spanning the hocks, the method comprising the steps of:

suspending the carcasses on shackles by the feet and advancing the carcasses along a conveyance path past a stationary blade;

applying a progressive wedging action into the centers of the hocks from above and behind the hocks of each carcass as the carcass is moved past the stationary blade to force the heads out of the sockets and expose the connective tissue, and severing the connective tissue.

12. A method as recited in claim 11, further comprising the steps of guiding the drumsticks of each carcass along the conveyance path, and camming each shackle laterally forward of the conveyance path so that the feet and shanks of each carcass are drawn forward of the drumsticks relative to the carcass as the carcass passes through the hock cutter assembly.

13. A method as recited in claim 12, further comprising the step of lowering the shackles relative to the stationary cutter blade as the carcasses are moved past the blade.

14. A method as recited in claim 13, further comprising the step of bending the shanks of each carcass forward relative to the drumsticks as the carcass moves past the blade so that the heads on the drumsticks are engaged by the blade and wedged free of the sockets on the shanks.

* * * * *